United States Patent

Keithly et al.

[11] Patent Number: 6,143,347
[45] Date of Patent: Nov. 7, 2000

[54] EARLY SEASON NOT FROM CONCENTRATE ORANGE JUICE AND PROCESS OF MAKING

[75] Inventors: James H. Keithly, Bradenton; Harold Pollack, St Petersburg; Thomas Taggart, Bradenton, all of Fla.

[73] Assignee: Tropicana Products, Inc., Bradenton, Fla.

[21] Appl. No.: 09/311,956

[22] Filed: May 14, 1999

[51] Int. Cl.[7] .................................................. A23L 2/02
[52] U.S. Cl. .................................... 426/599; 426/616
[58] Field of Search .................................. 426/616, 599

[56] References Cited

U.S. PATENT DOCUMENTS

| | | | |
|---|---|---|---|
| 3,227,562 | 1/1966 | Houghtaling | 426/599 |
| 5,298,483 | 3/1994 | Yokoyama et al. | 504/326 |
| 5,468,508 | 11/1995 | Wu et al. | 426/599 |
| 6,007,863 | 12/1999 | Chenchin et al. | 426/599 |

FOREIGN PATENT DOCUMENTS 288103  11/1988  European Pat. Off. .

OTHER PUBLICATIONS

Nelson et al. Fruit and Vegetable Juice Processing Technology, 3rd Ed. Avi Publishing Co, Westport, CT, pp. 41, 42 and 64, 1980.

Pio, Junior and Sobrinho, Study of Some Characteristics of Fruit and Seeds of Various Kinds of Sweet Orange, *Citrus sinensis* (L.) Osbeck, Sao Paulo, Brazil (circa 1983).

Redd, Hendrix and Hendrix, *Quality Control Manual For Citrus Processing Plants*, vol. I, pp. 22–31, Intercit, Inc., Safety Harbor, Florida (1986).

*Primary Examiner*—Helen Pratt
*Attorney, Agent, or Firm*—Cook, Alex, McFarron, Manzo, Cummings & Mehler, Ltd.

[57] ABSTRACT

Not from concentrate orange juice is provided which includes as a freshly squeezed orange juice component juice extracted from an early season round orange cultivar which has a color intensity in excess of that provided by Hamlin cultivars which are harvested at the same time as the early season cultivar, which is not a Hamlin cultivar. The juice extracted from such early season cultivar has sensory attributes which are at least as acceptable as Hamlin fresh juice. Preferred early season cultivars are within the Seleta family or are Westin cultivars or are Ruby Nucellar cultivars.

47 Claims, 12 Drawing Sheets

CROP B

EARLY SEASON NOT FROM CONCENTRATE ORANGE JUICE AND PROCESS OF MAKING

BACKGROUND OF THE INVENTION

This invention generally relates to orange juice which is prepared from juice sources which have not been subjected to procedures which concentrate the juice. In the citrus industry, this type of juice product is known as being a "not from concentrate" juice. More particularly, the invention relates to an improved early season not from concentrate orange juice which consistently exhibits unusually high Color Number values during the time period which is early in the orange fruit bearing or harvest season. The use of orange tree cultivars which exhibit Color Number values significantly different from those of traditional early season round oranges, especially Hamlin round oranges, is an important component of the invention.

One of the problems facing the not from concentrate orange juice industry is the maintenance of a consistent, deep rich orange color throughout the year. This problem is especially difficult during the early fruit-harvesting season of orange trees. It will be appreciated that different varieties or cultivars of orange trees bear harvest-ready fruit at somewhat different times within the overall citrus growing season. In the Northern Hemisphere, traditionally the overall citrus growing season extends between approximately October and June. Generally speaking, Valencia round oranges can be considered to provide a bench mark for orange juice quality, both with respect to analytical properties and sensory properties. Many not from concentrate juices are a blend of freshly squeezed juice with stored juice, which can be stored Valencia juice, for example. Valencia cultivars tend to have a growing season which is in a later portion of the overall round orange harvest season. A typical Valencia season runs between about late February and early June. Other round oranges such as Hamlin oranges are early season harvested for freshly squeezed orange juice, such as during approximately the months of October, November and December. Certain orange cultivars such as Pineapple oranges have a mid-season harvest characteristic, running between about January and early March.

In the not from concentrate juice industry, particularly when Valencia oranges are not yet in season, the freshly squeezed juice component can be one of these earlier maturing varieties. At present, the principal early season variety for providing the freshly squeezed orange juice component is the Hamlin variety. One of the drawbacks of Hamlin round oranges is that a Hamlin round orange crop does not, in general, meet all of the quality standards of Valencia round oranges. One of these relates to color.

Color is a property of juices which can be measured in an objective manner for purposes of evaluating the color acceptability of a particular type of juice. In the case of citrus juices, the industry generally recognizes a parameter referred to as Color Number. Details of color determination, including procedures, equipment and standards, are found in Redd, Hendrix and Hendrix, *Quality Control Manual for Citrus Processing Plants,* Volume 1: *Regulation, Citrus Methodology, Microbiology, Conversion Charts, Tables, Other;* 1986; Intercit., Inc., Safety Harbor, Fla. A calorimeter is a primary component of the Color Number determination procedure. Redd et al provides specific calibration information for a variety of such instruments, including HunterLab Model D45, HunterLab Model D45D2, HunterLab LabScan Colorimeter Model LS-5100, MacBeth Color-Eye Colorimeter Model 1500 and Minolta Portable Colorimeter Model Chroma Meter II Reflectants/CR 100.

These objective Color Number data are important components of categorizing single strength orange juice as, for example, Grade A or Grade B juice. A Grade B orange juice has a Color Number of between 32 and 35 CN units. A Grade A orange juice has a Color Number of between 36 and 40 CN units. A high quality not from concentrate orange juice seeks to meet the Grade A standard, although this is not always possible, particularly for the earlier season juices.

In addition, it has come to be appreciated through objective testing that juice color has an important impact on consumer liking of orange juice. Sensory tests which evaluated juice properties concluded that orange juice color intensity is important to consumer acceptance and preference. Generally speaking, consumer liking for orange juice increases as the color becomes darker and more orange. It has been determined that consumers can clearly detect an increase in color of as low as 1 Color Number or Color value unit. The testing included juices having various Color Numbers, ranging between about 34 CN to about 42 CN. Juices having a higher Color Number in a comparison set were chosen as more desirable. Accordingly, it now has come to be appreciated that color intensity is a very important characteristic of orange juice products in general and of not from concentrate orange juice in particular.

Other characteristics also are very important to maintaining or enhancing consumer acceptance of not from concentrate orange juice. These include sensory data which can be generally referred to as sweetness/tartness balance, strength of orange flavor, and the like. Also important are chemical analysis standards including total minimum solids percentage (or Brix), citric acid content, and Brix to acid ratio (or BAR). Other analysis parameters include percentage of oil and percentage of vitamin C. Even though color has been found to be very important in consumer acceptance, superior color intensity should not be achieved at the expense of these other characteristics of sensory qualities and chemical analysis standards.

When these factors are considered in connection with early season not from concentrate orange juice, it would be extremely valuable to be able to maintain these parameters and characteristics for a freshly squeezed juice blend component, while enhancing color scores which are traditionally low for early season round oranges, particularly Hamlin round oranges. In other words, while color has been determined to be an important component of consumer acceptance of orange juice, color enhancement cannot be achieved at the expense of maintaining the other characteristics of a first-class not from concentrate orange juice. It is also important that the color enhancement be achieved without the use of artificial colorants or coloring components which disqualify the orange juice product from falling within the standard of identity of not from concentrate orange juice. Otherwise, color enhancement would seriously negatively impact on the orange juice.

Accordingly, an important need exists for an approach to enhance early season color in not from concentrate orange juice without negatively impacting upon other attributes of first-class not from concentrate orange juice which provide such products with important, tangible and economically valuable benefits when compared with "from concentrate" orange juice products and the like. It is also important that color enhancement be achieved in a fully natural manner and in a way which is fully consistent with the standard of identity of not from concentrate orange juice, particularly when dealing with early season round orange harvests.

Additionally, important advantages would be realized by being able to meet the standards for freshly squeezed orange juice for not from concentrate orange juice during a time period which is earlier than that of the long-accepted early season cultivar, Hamlin round oranges. This would allow an advancement of the date by which freshly squeezed juice can be incorporated into not from concentrate orange juice, which would benefit the not from concentrate orange juice category. To do so requires that such a freshly squeezed juice source would also be able to maintain the desirable flavor characteristics during such a very early harvest time period. Accordingly, there is a need for an exceptionally early season source for freshly squeezed orange juice.

SUMMARY OF THE INVENTION

In accordance with the present invention, very early season not from concentrate orange juice is provided which has exceptional early season color. This very early season color is superior to that of Hamlin round oranges while exhibiting sensory qualities which are substantially equivalent to those of Hamlin round oranges. This includes extracting the juice from round orange cultivar fruit that has been discovered to possess very early season color intensity which is superior to that of round orange cultivars which have been in use heretofore. These cultivars possessing superior very early season color have been found to include those within the Seleta family of cultivars. Non-Seleta cultivars which have been found to be useful along these lines are Westin round oranges and Ruby Nucellar round oranges. The extracted orange juice from these very early season superior color cultivars have a Color Number of at least 33 CN units. This very early season juice is blended with other juice sources in order to provide a not from concentrate orange juice having a color value above, or just below the color standards for Grade A orange juice.

It is accordingly a general object of the present invention to provide improved early season not from concentrate orange juice.

Another object of this invention is to provide an improved method by which very early season not from concentrate orange juice color is improved over that available from using Hamlin round orange juice as a freshly squeezed early season cultivar of the orange juice.

Another object of the present invention is to provide an improved not from concentrate orange juice which has enhanced early season color and thus enhanced value.

Another object of the present invention is to provide an improved very early season not from concentrate orange juice which meets governmental crop maturity criteria, such as Brix-to-acid ratio and citric acid percentage, earlier in the season than do currently used early season round orange cultivars.

Another object of the invention is to provide very early season freshly squeezed orange juice which maintains sensory characteristics of traditional early season freshly squeezed orange juice such as Hamlin juice.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

Figure 1:
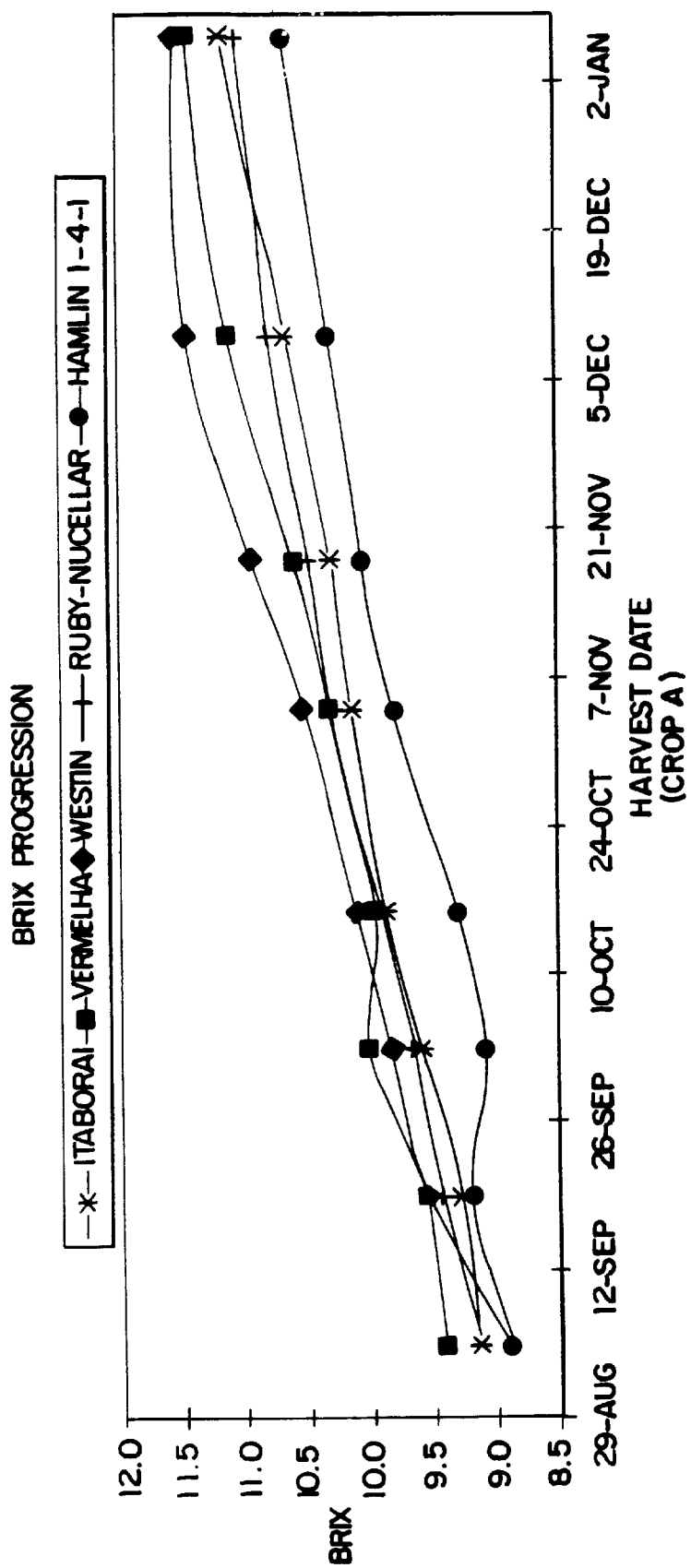
FIG. 1 is a plot of Brix values for five different cultivars, showing the progression of Brix development during a portion of a Crop A growing season.

Not from concentrate orange juice in accordance with the present invention incorporates juice from round orange cultivars which are high color, very early season varieties that can be harvested during a season approximately that of Hamlin round orange cultivars, or earlier. Unlike Hamlin round orange cultivars, however, the cultivars concerning the present invention are far superior in very early season properties than are Hamlin round oranges. These are advantageous properties which are instrumental in providing not from concentrate orange juice which is of enhanced value for very early season use. Also advantageous is the fact that not from concentrate juices according to the invention exhibit a flavor profile which is at least as beneficial as that provided when Hamlin round oranges are incorporated instead. Accordingly, enhanced properties are imparted to the not from concentrate orange juice in accordance with the present invention without detracting from the other positive properties and characteristics of not from concentrate orange juice in general. The result is an early season not from concentrate orange juice which is improved over that currently available, which includes incorporating freshly squeezed Hamlin orange juice.

Very early season round orange cultivars which are used in the process and included in the juice according to the present invention provide juice having Color Number values which are consistently larger and superior to the Color Number value of Hamlin juice substantially throughout the harvest season for these very early round oranges. The cultivars of the invention have been found to possess exceptional early season color and other important properties such as Brix to acid ratio. These cultivars are variously referred to herein by the general terms "early season cultivars" or "very early season cultivars." It will be understood that these terms exclude Hamlin round orange varieties which, although an early season fruit, does not possess the other properties of these very early season cultivars.

With more particular reference to these very early season cultivars, they exhibit early season color which is more intense than the early season color of juice extracted from Hamlin round oranges, particularly during the early harvest season months of October and November. The juice from these very early season cultivars also exhibits the minimum total solids weight percentages (or minimum Brix values) which are in excess of those provided by juice from Hamlin round oranges. Typically, these very early season cultivars satisfy Brix to acid ratio (BAR) requirements of the State of Florida Department of Agriculture at a time in the harvest season prior to that at which such standard is achieved by Hamlin round orange cultivars. It will be appreciated that Brix is a well-recognized parameter by which the quality of fruits including citrus fruits such as oranges is measured. A Brix measurement is a minimum total solids percentage by weight, which is at times loosely equated to sweetness or sugars present in the fruit. It is also generally appreciated that the acid in the Brix to acid ratio is citric acid.

As an example of the citrus fruit maturity requirements of the Florida Department of Agriculture and Consumer Services, orange standards of this agency for a particular recent growing season were as follows. For oranges harvested between August 1 and October 31, the minimum total solids are permitted vary between 9.0° Brix and below 11.0° Brix. Furthermore, these State of Florida specifications specify that a corresponding minimum BAR must be met for each Brix value within this range. Different standards apply for different stages of the year. More particularly, the standards referred to herein are in accordance with the following Table I.

TABLE I

ROUND ORANGE MATURITY CHART

| Brix | BAR |
| --- | --- |
| August 1–October 31 | |
| 9.0 to not including 9.1 | 10.00 to 1 |
| 9.1 to not including 9.2 | 9.95 to 1 |
| 9.2 to not including 9.3 | 9.90 to 1 |
| 9.3 to not including 9.4 | 9.85 to 1 |
| 9.4 to not including 9.5 | 9.80 to 1 |
| 9.5 to not including 9.6 | 9.75 to 1 |
| 9.6 to not including 9.7 | 9.70 to 1 |
| 9.7 to not including 9.8 | 9.65 to 1 |
| 9.8 to not including 9.9 | 9.60 to 1 |
| 9.9 to not including 10.0 | 9.55 to 1 |
| 10.0 to not including 10.1 | 9.50 to 1 |
| 10.1 to not including 10.2 | 9.45 to 1 |
| 10.2 to not including 10.3 | 9.40 to 1 |
| 10.3 to not including 10.4 | 9.35 to 1 |
| 10.4 to not including 10.5 | 9.30 to 1 |
| 10.5 to not including 10.6 | 9.25 to 1 |
| 10.6 to not including 10.7 | 9.20 to 1 |
| 10.7 to not including 10.8 | 9.15 to 1 |
| 10.8 to not including 10.9 | 9.10 to 1 |
| 10.9 to not including 11.0 | 9.05 to 1 |
| November 1–November 15 | |
| 8.7 to not including 8.8 | 10.15 to 1 |
| 8.8 to not including 8.9 | 10.10 to 1 |
| 8.9 to not including 9.0 | 10.05 to 1 |

TABLE I-continued

ROUND ORANGE MATURITY CHART

| Brix | BAR |
| --- | --- |
| November 16–November 30 | |
| 8.5 to not including 8.6 | 10.25 to 1 |
| 8.6 to not including 8.7 | 10.20 to 1 |
| December 1–July 31 | |
| 8.0 to not including 8.1 | 10.50 to 1 |
| 8.1 to not including 8.2 | 10.45 to 1 |
| 8.2 to not including 8.3 | 10.40 to 1 |
| 8.3 to not including 8.4 | 10.35 to 1 |
| 8.4 to not including 8.5 | 10.30 to 1 |

Figure 11:
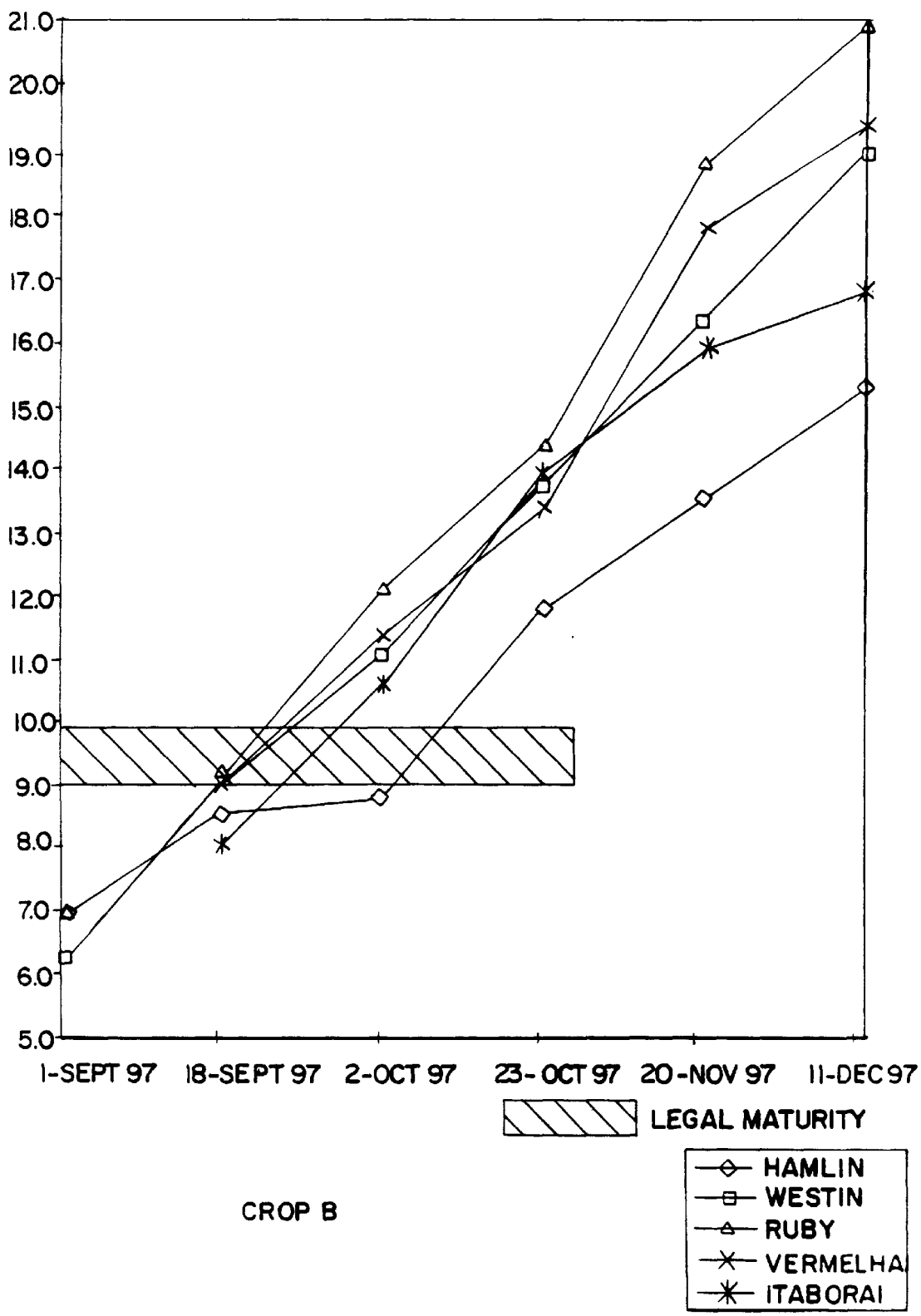
FIG. 11 is a further plot of the data in FIG. 6 and also illustrating when each Crop B cultivar met governmental BAR standards.
Figure 12:
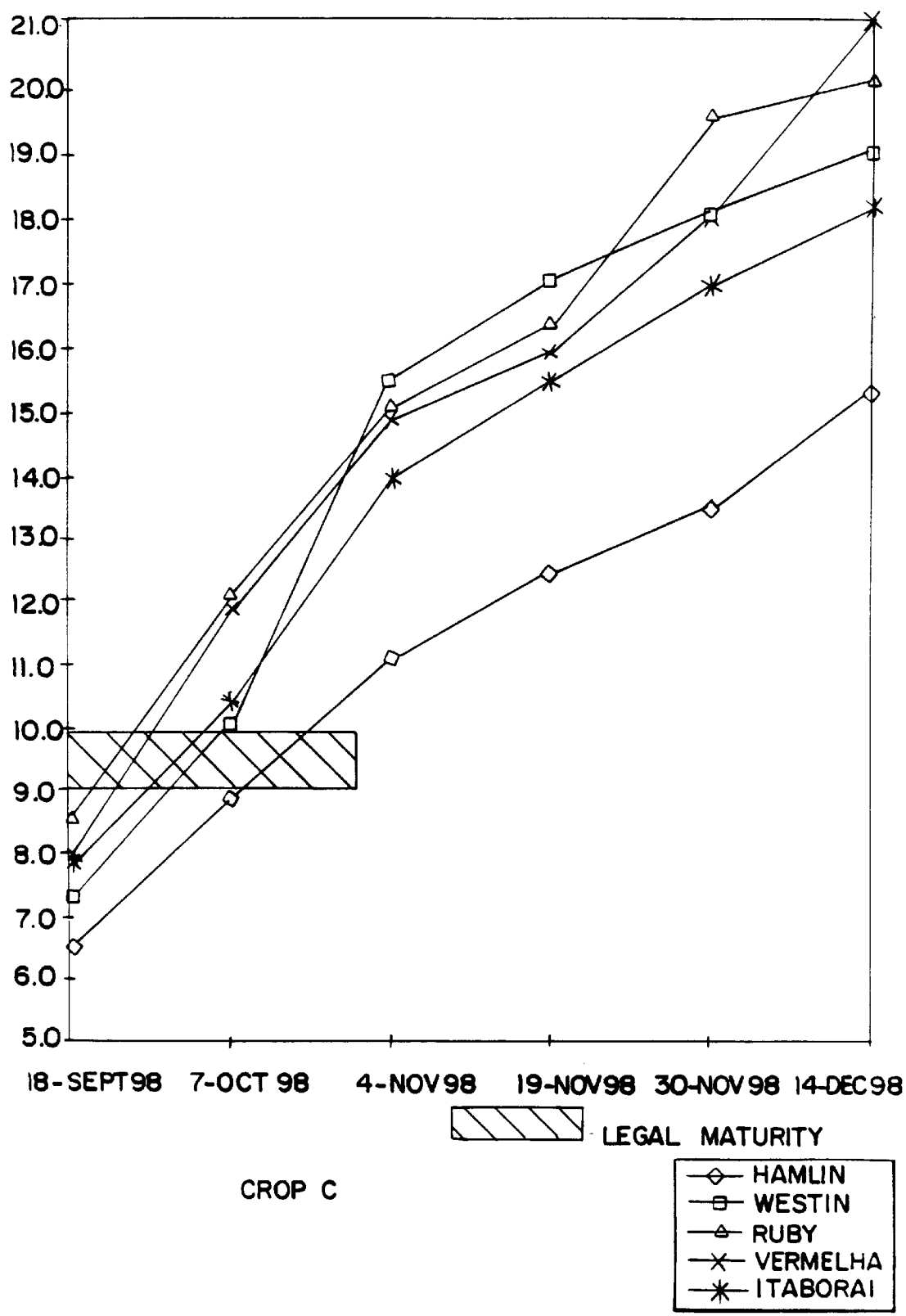
FIG. 12 is a further plot of BAR data for Crop C, also showing governmental BAR standards.

The very early season cultivars meet or exceed the round orange standards as noted in Table I, typically at a date earlier than they are met by Hamlin round oranges. This is illustrated in FIG. 11 and FIG. 12, discussed in Examples 2 and 3.

These very early season cultivars are a Ruby Nucellar cultivar, a Westin cultivar or are within the Seleta family of cultivars. Juices from one or a combination of these cultivars are included. Examples of members of the Seleta family of cultivars include Seleta Branca, Seleta Coroa-do-Rei, Seleta de Itaborai and Seleta Vermelha. Preferred early cultivars are Seleta de Itaborai, Seleta Vermelha, Ruby Nucellar and Westin. The Seleta Vermelha is to be released in the State of Florida under the name "Earlygold". It remains within the Seleta family of round orange cultivars.

It will be appreciated that large-scale commercial production of not from concentrate orange juice typically includes a blend operation. For example, in the fall of the year in the Northern Hemisphere, stored juice supplies are blended with early season fresh juice in order to provide the not from concentrate orange juice which is filled into cartons for distribution and consumption by the consumer. Typically, in the early months of the fresh juice harvest season, this fresh juice supply is from Hamlin round oranges. Hamlin round oranges have a peak harvest season between about mid-October and March. The very early season cultivars have a significantly earlier peak harvest season, namely from September through November. The very early season cultivars also exhibit relatively high Color Numbers during their peak harvest season. Typically, the maximum Color Numbers achieved by the very early season cultivars during this peak harvest season are higher than the maximum Color Numbers achieved by Hamlin oranges during the same respective time periods. For example, during this time frame, the juice from Hamlin round oranges has a peak color number of about 32 CN. The early season cultivars have a higher color number, typically at least 33 CN and above at a comparable time of the year.

Within the context of commercial production of not from concentrate orange juice during this early season time frame, a typical target Color Number for the in-carton not from concentrate orange juice is at least 36 CN. It will be appreciated that, because such production is dependent upon naturally occurring juice sources which have not been concentrated, this target is not always strictly met and at times can be between 35 CN to about 37 CN, especially within this early season time frame. It will be further appreciated that the freshly squeezed juice, especially within this early season time frame, is blended with stored juice, such as that which has been frozen as whole juice or stored as whole juice. In a production within which only Hamlin juice sources having a maximum Color Number of 32 CN are used as the fresh juice component of the not from concentrate blend, a greater proportion of stored juice is required than when the fresh juice component is from one of the very early season cultivars, if the target Color Number is to be achieved by the not from concentrate blend.

Advantageously, the higher early season Color Number values which are characteristic of the very early season cultivars of the invention will permit either a larger relative percentage of fresh juice or a cartoned product having a higher Color Number than otherwise obtainable with only Hamlin juice as the fresh juice source. Accordingly, in one aspect of the invention, the early season cultivar juice can be blended with Hamlin juice sources in order to provide an early season fresh juice source which has an increased color number. Alternatively, the early season cultivars can be the sole source of the fresh juice going into the cartoned blend.

Importantly, uses of the very early season cultivars in preparing not from concentrate orange juice products is made even more advantageous because of other properties of these early season cultivars. These early season cultivars achieve a BAR level which satisfies regulatory requirements for fruit maturity at a time which is earlier in the growing season than traditional early season cultivars such as Hamlin round oranges. This facilitates the ability of the fresh juice to meet governmental regulations and to provide a product which is more likely to satisfy consumer standards as well. Additionally, juices prepared from the early season cultivars exhibit sensory evaluation results which are at least comparable to those of Hamlin round orange juices.

Exemplary illustrations of the disclosure herein are provided in the following examples.

EXAMPLE 1

Quantities of each of five different round orange cultivars were harvested on several different dates between September and January during the same growing season. Juice was recovered from each group of cultivars or each harvest date. Each juice was analyzed for the following: Brix as ° Brix, acid as weight percent citric acid, color as Color Number; oil as weight percent d-limonene; and vitamin C in mg/100 ml of juice. These are identified as Crop A results. The data are reported in Table II. In addition, the Brix, BAR and Color Number data are plotted in FIG. 1, FIG. 2 and FIG. 3, respectively.

TABLE II

| | CROP A | | | | | |
|---|---|---|---|---|---|---|
| VARIETY | DATE | Brix | Acid (% wt) | BAR | Color (CV) | Oil | Vitamin C |
| Hamlin | 05 - Sept | 8.90 | 1.46 | 5.97 | 30.50 | 0.032 | 51.26 |
| | 19 - Sept | 9.22 | 1.20 | 7.71 | 31.88 | 0.019 | 54.55 |
| | 03 - Oct | 9.09 | 1.09 | 8.41 | 32.58 | 0.020 | 50.42 |
| | 16 - Oct | 9.31 | 0.92 | 10.25 | 31.85 | 0.004 | 50.81 |
| | 06 - Nov | 9.80 | 0.78 | 12.64 | 33.30 | 0.004 | 51.28 |
| | 18 - Nov | 10.06 | 0.77 | 13.02 | 33.83 | 0.004 | 48.16 |
| | 09 - Dec | 10.33 | 0.74 | 13.90 | 35.30 | 0.004 | 47.00 |
| | 06 - Jan | 10.68 | 0.64 | 16.64 | 35.62 | 0.005 | 48.96 |
| Westin | 05 - Sept | 8.90 | 1.35 | 6.58 | 30.23 | 0.044 | 43.65 |
| | 19 - Sept | 9.55 | 1.09 | 8.79 | 32.03 | 0.031 | 44.51 |
| | 03 - Oct | 9.85 | 0.93 | 10.62 | 33.57 | 0.024 | 41.52 |
| | 16 - Oct | 10.10 | 0.85 | 12.07 | 33.23 | 0.003 | 39.67 |

TABLE II-continued

| | CROP A | | | | | |
|---|---|---|---|---|---|---|
| VARIETY | DATE | Brix | Acid (% wt) | BAR | Color (CV) | Oil | Vitamin C |
| | 06 - Nov | 10.53 | 0.65 | 16.38 | 34.47 | 0.002 | 40.23 |
| | 18 - Nov | 10.93 | 0.66 | 16.67 | 35.23 | 0.003 | 40.92 |
| | 09 - Dec | 11.46 | 0.61 | 18.96 | 36.30 | 0.004 | 39.03 |
| | 06 - Jan | 11.58 | 0.55 | 21.07 | 37.37 | 0.003 | 38.67 |
| Ruby-nucellar | 05 - Sept | 9.13 | 1.28 | 7.12 | 33.02 | 0.064 | 41.67 |
| | 19 - Sept | 9.43 | 1.03 | 9.18 | 33.40 | 0.070 | 40.38 |
| | 03 - Oct | 9.66 | 0.91 | 10.73 | 34.92 | 0.065 | 42.98 |
| | 16 - Oct | 9.92 | 0.73 | 13.66 | 34.88 | 0.008 | 39.19 |
| | 06 - Nov | 10.30 | 0.63 | 16.45 | 35.65 | 0.006 | 38.21 |
| | 18 - Nov | 10.50 | 0.62 | 16.94 | 36.58 | 0.009 | 37.66 |
| | 09 - Dec | 10.80 | 0.60 | 17.95 | 36.62 | 0.011 | 36.02 |
| | 06 - Jan | 11.06 | 0.52 | 21.32 | 37.38 | 0.011 | 35.12 |
| Vermelha (Earlygold) | 05 - Sept | 9.42 | 1.36 | 6.96 | 33.02 | 0.077 | 44.19 |
| | 19 - Sept | 9.57 | 1.12 | 8.62 | 33.38 | 0.064 | 44.63 |
| | 03 - Oct | 10.02 | 0.95 | 10.66 | 34.92 | 0.051 | 43.23 |
| | 16 - Oct | 9.98 | 0.76 | 13.28 | 34.83 | 0.010 | 41.64 |
| | 06 - Nov | 10.34 | 0.67 | 15.52 | 35.90 | 0.006 | 41.17 |
| | 18 - Nov | 10.60 | 0.65 | 16.44 | 36.45 | 0.008 | 40.05 |
| | 09 - Dec | 11.13 | 0.62 | 18.11 | 37.10 | 0.010 | 39.64 |
| | 06 - Jan | 11.46 | 0.53 | 21.83 | 37.30 | 0.013 | 40.58 |
| Itaborai | 05 - Sept | 9.15 | 1.39 | 6.62 | 33.17 | 0.066 | 41.29 |
| | 19 - Sept | 9.30 | 1.23 | 7.62 | 33.98 | 0.060 | 40.92 |
| | 03 - Oct | 9.60 | 0.98 | 9.90 | 35.50 | 0.052 | 39.70 |
| | 16 - Oct | 9.88 | 0.85 | 11.68 | 35.10 | 0.008 | 38.65 |
| | 06 - Nov | 10.14 | 0.71 | 14.31 | 36.40 | 0.006 | 36.80 |
| | 18 - Nov | 10.32 | 0.70 | 14.83 | 36.85 | 0.007 | 36.75 |
| | 09 - Dec | 10.66 | 0.69 | 15.56 | 37.05 | 0.011 | 34.73 |
| | 06 - Jan | 11.19 | 0.60 | 18.84 | 37.90 | 0.010 | 33.64 |

Figure 2:
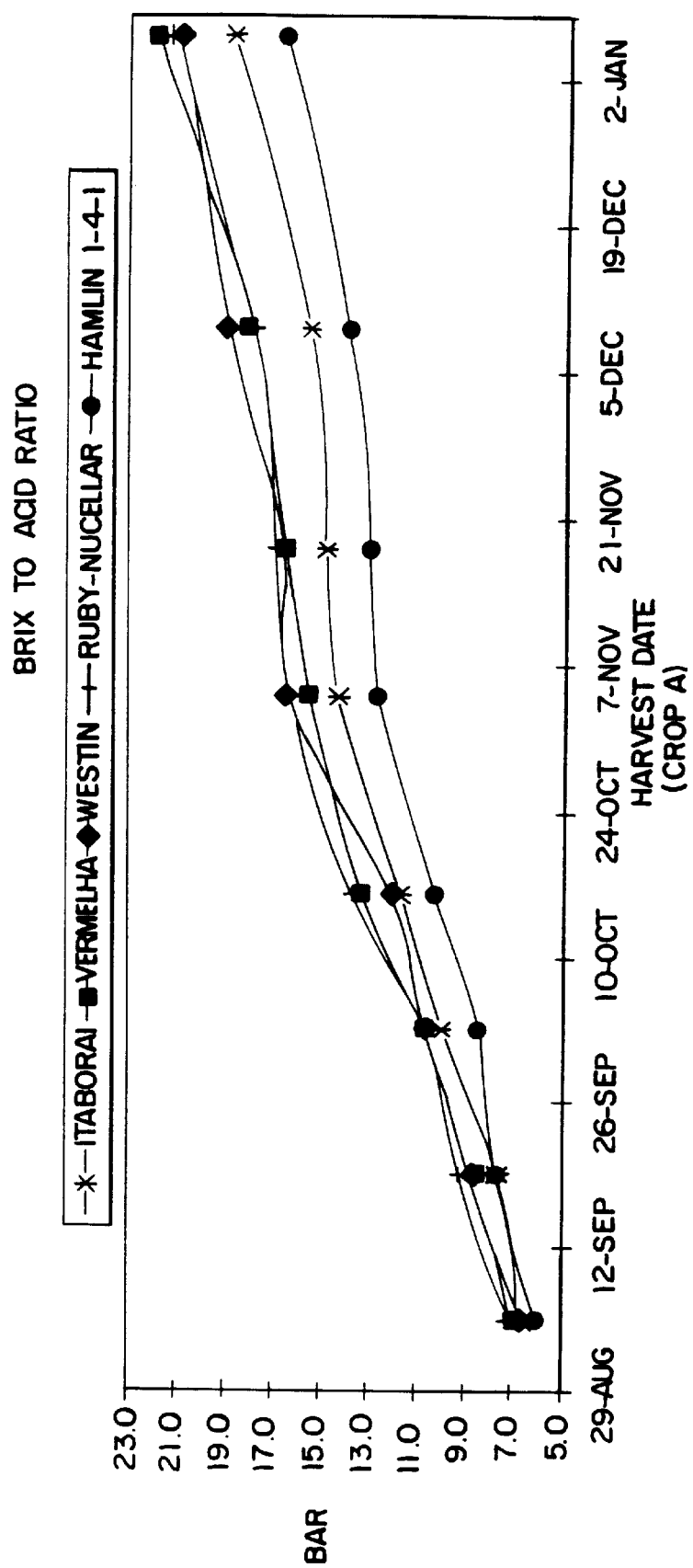
FIG. 2 is a plot of the ratio of Brix to citric acid content for Crop A.
Figure 3:
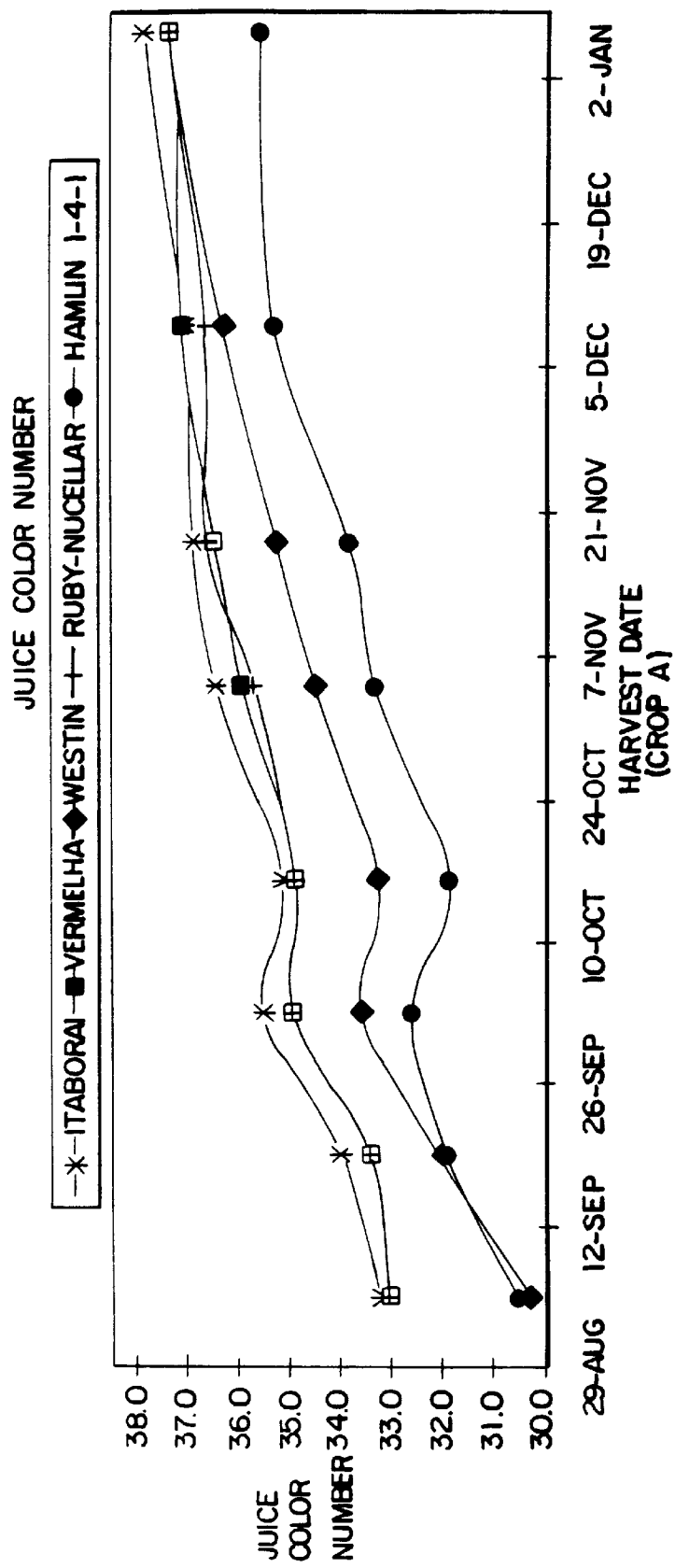
FIG. 3 is a plot of juice Color Number for the Crop A cultivars showing color development during the indicated time period.

From FIG. 1, it will be noted that each of the very early season cultivars exhibited Brix values equal to or greater than that of the Hamlin round oranges. This is especially evident in the general October time frame. Similar observations can be made with respect to the BAR data reported in FIG. 2. FIG. 3 shows that, with the exception of very early harvests, the juice Color Number is higher for each of the very early season cultivars than for the Hamlin juice. In general, this difference is about one Color Number or greater. This important advantageous effect is especially evident in the general October and November time frame, which is important for early season fresh juice supplies.

EXAMPLE 2

Additional pieces of fruit from the round orange cultivars of Example 1 are categorized as Crop B fruit. Extraction and analysis were carried out, results being reported in Table III.

TABLE III

| | CROP B | | | | | |
|---|---|---|---|---|---|---|
| VARIETY | DATE | BRIX | ACID | BAR | COLOR | OIL | VIT C |
| HAMLIN | 01 - Sept | 9.47 | 1.34 | 7.07 | 30.80 | 0.006 | 64.31 |
| | 15 - Sept | 9.11 | 1.06 | 8.64 | 31.40 | 0.005 | 53.24 |
| | 02 - Oct | 8.73 | 1.01 | 8.85 | 32.53 | 0.010 | 47.86 |
| | 23 - Oct | 9.53 | 0.80 | 11.96 | 33.03 | 0.004 | 49.44 |
| | 20 - Nov | 10.29 | 0.76 | 13.56 | 33.90 | 0.005 | 39.05 |
| | 11 - Dec | 10.40 | 0.68 | 15.38 | 35.13 | 0.005 | 49.81 |
| WESTIN | 01 - Sept | 9.29 | 1.45 | 6.41 | 31.40 | 0.002 | 47.73 |
| | 15 - Sept | 9.15 | 1.01 | 9.16 | 31.80 | 0.005 | 47.90 |
| | 02 - Oct | 9.40 | 0.85 | 11.12 | 33.53 | 0.004 | 42.78 |
| | 23 - Oct | 9.98 | 0.73 | 13.82 | 34.53 | 0.004 | 41.75 |
| | 20 - Nov | 10.90 | 0.67 | 16.45 | 35.63 | 0.004 | 39.48 |
| | 11 - Dec | 11.19 | 0.59 | 19.07 | 37.40 | 0.005 | 42.01 |

TABLE III-continued

CROP B

| VARIETY | DATE | BRIX | ACID | BAR | COLOR | OIL | VIT C |
|---|---|---|---|---|---|---|---|
| RUBY | 15 - Sept | 8.08 | 0.88 | 9.24 | 33.15 | 0.011 | 36.44 |
|  | 02 - Oct | 8.61 | 0.50 | 12.20 | 34.73 | 0.009 | 36.89 |
|  | 23 - Oct | 9.33 | 0.65 | 14.47 | 34.77 | 0.007 | 35.52 |
|  | 20 - Nov | 10.17 | 0.54 | 18.77 | 35.60 | 0.008 | 30.46 |
|  | 11 - Dec | 10.03 | 0.48 | 21.16 | 36.00 | 0.011 | 34.73 |
| VER-MELHA | 15 - Sept | 8.80 | 0.98 | 9.02 | 33.50 | 0.008 | 41.72 |
| (Earlygold) | 02 - Oct | 9.23 | 0.81 | 11.44 | 34.93 | 0.010 | 41.66 |
|  | 23 - Oct | 9.98 | 0.75 | 13.32 | 35.33 | 0.010 | 41.81 |
|  | 20 - Nov | 10.86 | 0.62 | 17.76 | 36.27 | 0.010 | 42.06 |
|  | 11 - Dec | 11.32 | 0.59 | 19.43 | 37.17 | 0.013 | 42.90 |
| ITABORAI | 15 - Sept | 8.41 | 1.05 | 8.08 | 33.40 | 0.008 | 36.21 |
|  | 02 - Oct | 9.00 | 0.85 | 10.67 | 34.90 | 0.007 | 37.66 |
|  | 23 - Oct | 9.74 | 0.71 | 13.83 | 35.60 | 0.008 | 37.14 |
|  | 20 - Nov | 10.30 | 0.65 | 15.95 | 36.67 | 0.008 | 32.40 |
|  | 11 - Dec | 10.56 | 0.64 | 16.70 | 37.30 | 0.012 | 34.98 |

Figure 4:
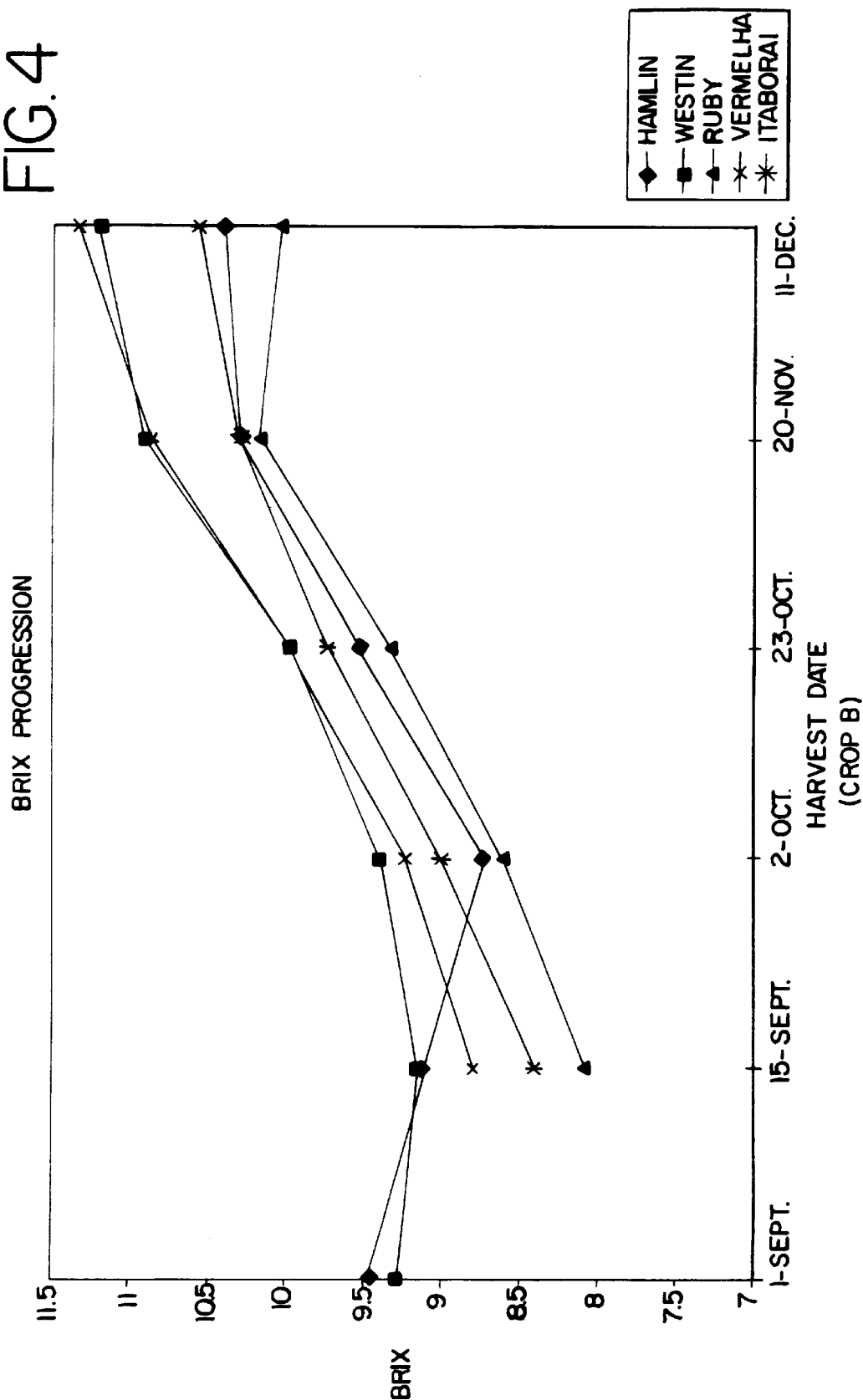
FIG. 4 is a plot of Brix values for five different cultivars, showing the progression of Brix development during a portion of a Crop B growing season.
Figure 5:
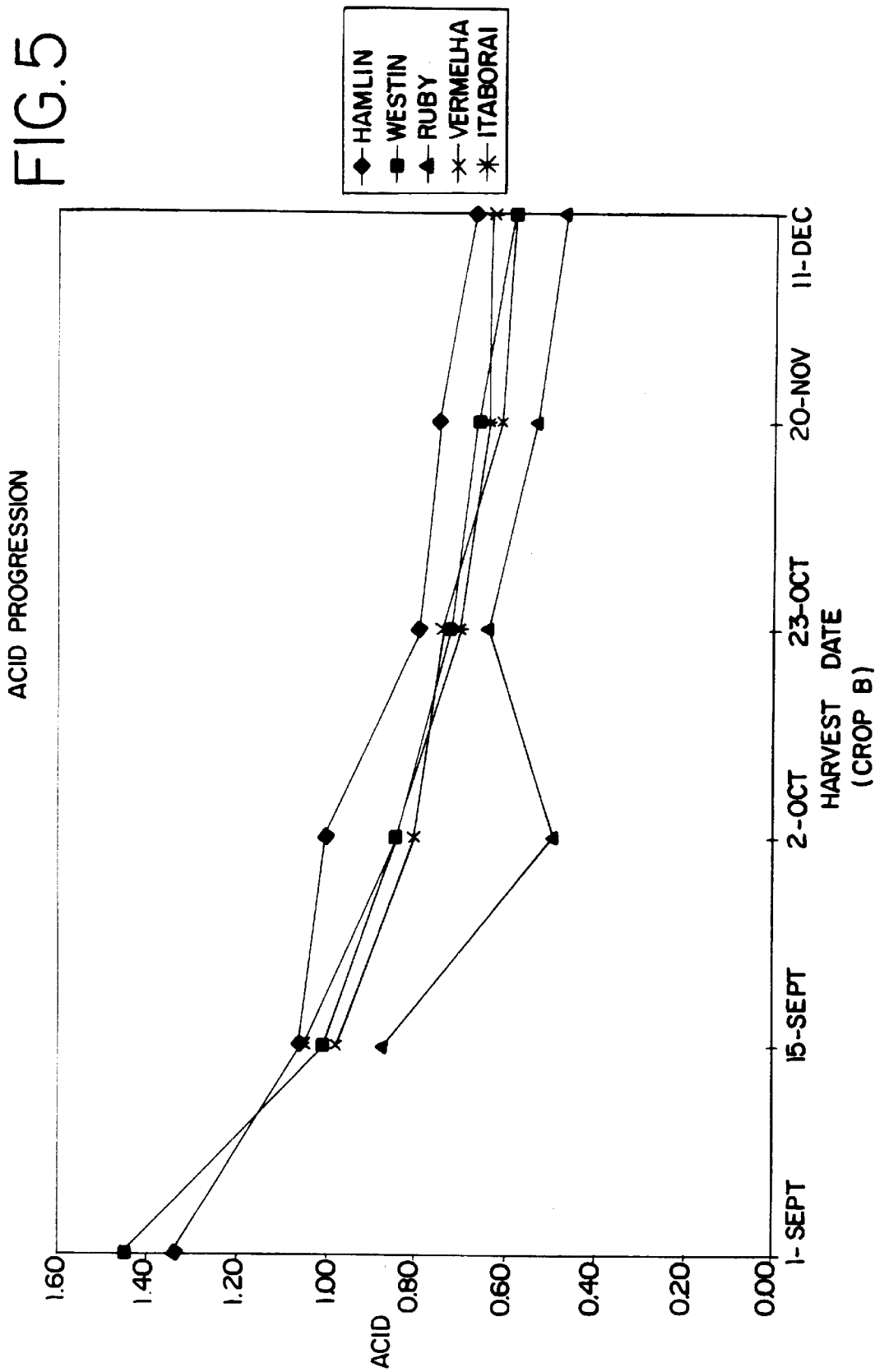
FIG. 5 is a plot of citric acid values showing acid progression for the cultivars of Crop B during the indicated growing season.
Figure 6:
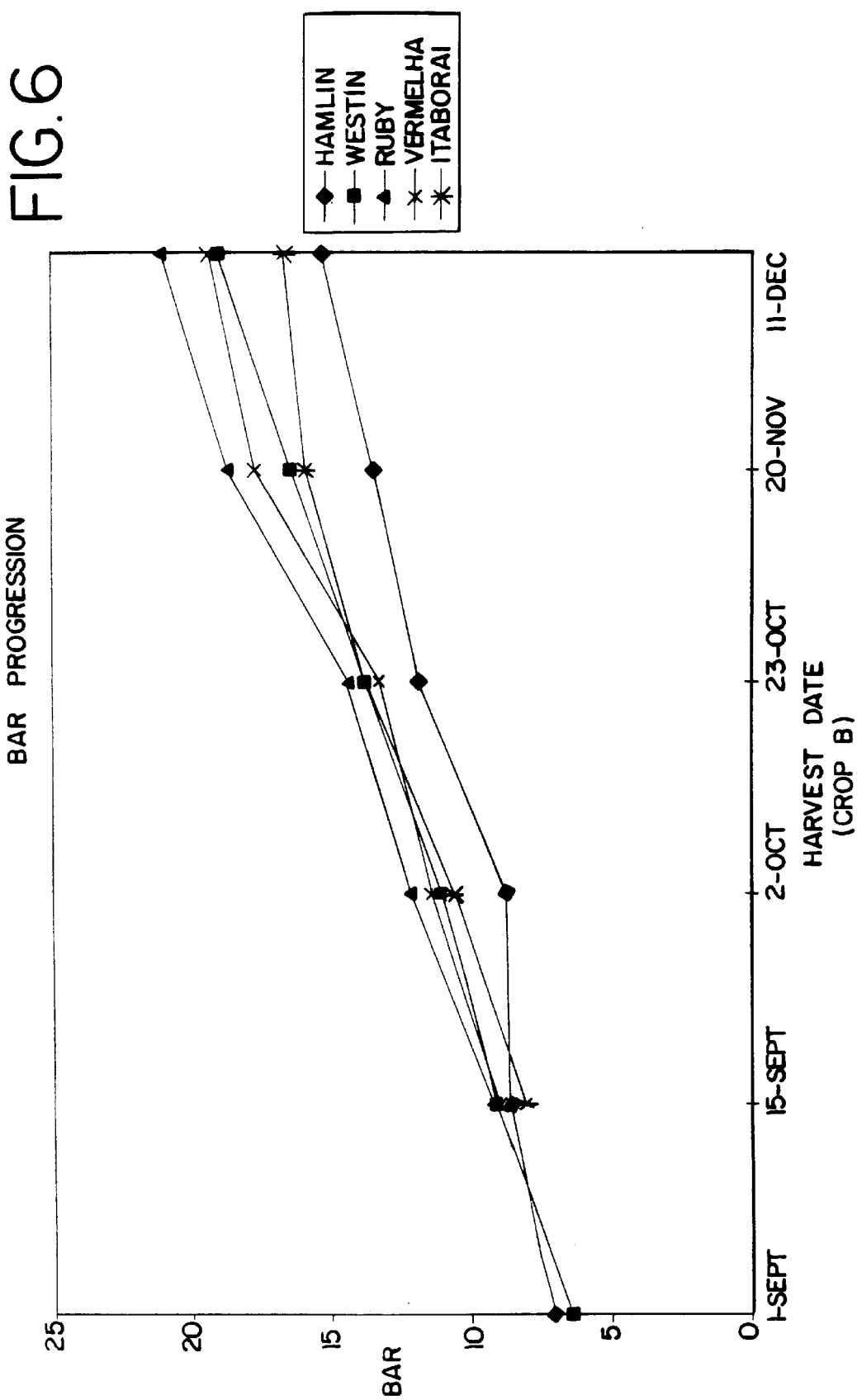
FIG. 6 is a plot of the ratio of Brix to citric acid content for Crop B.
Figure 7:
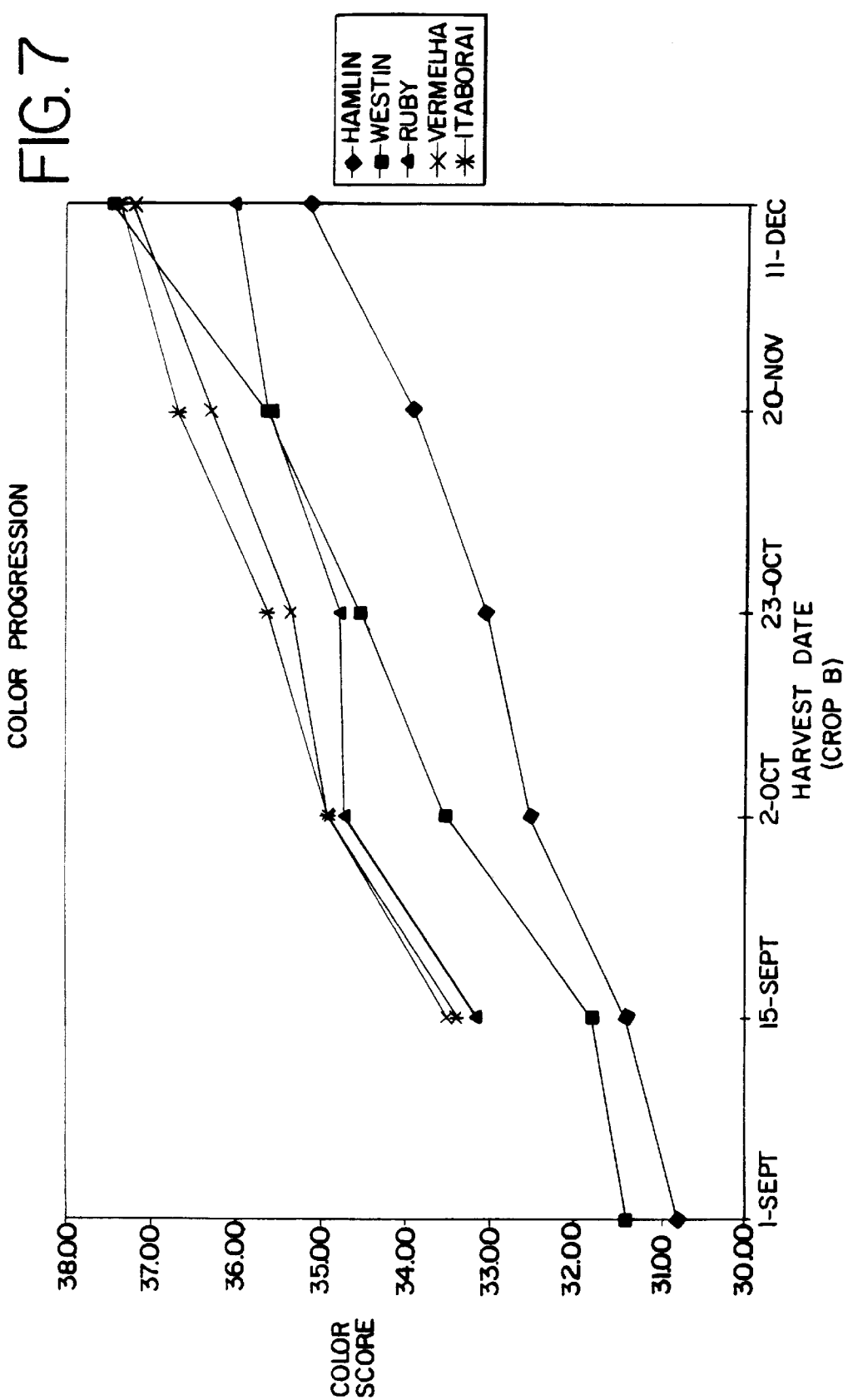
FIG. 7 is a plot of juice Color Number for the Crop B cultivars showing color development during the indicated time period.

Certain of these data are plotted as follows. FIG. 4 shows Brix values. FIG. 5 shows citric acid percentage. FIG. 6 shows BAR values, and FIG. 7 shows the Color Number data. In the October and November time frames, FIG. 4 shows that the Brix value for each of the very early season cultivars is about the same as or greater than that for the Hamlin fruit. As is evident from FIG. 5, the acid percentage is similar for each of the five cultivars, except for the Ruby Nucellar cultivar, especially in the October time frame, although the BAR data illustrated in FIG. 6 show that the BAR data for the Ruby Nucellar is noticeably superior to that of Hamlin and about the same or somewhat better than that for the other three very early season cultivars for the Crop B results. FIG. 7 shows the Color Number advantage of the very early season cultivars when compared with Hamlin juice of this Crop B testing. In the October and November time frame, the very early season cultivars have a Color Number advantage of at least 1 over the Hamlin juice. In some instances, the Color Number advantage is 2 CV or more.

FIG. 11 expands the scale of the BAR data plotted in FIG. 6. Also added is the orange standard information from Table I during the earliest season time frame. It is noted that the Hamlin harvest did not achieve the orange standard for BAR until about mid-October, whereas the Itaborai harvest achieved the BAR standard in mid-to-late September, with the other three very early season cultivar harvests reaching the BAR standard by mid-September for this Crop B fruit.

EXAMPLE 3

Crop C data for these same five cultivars are reported in Table IV.

TABLE IV

CROP C

| VARIETY | DATE | BRIX | ACID | BAR | COLOR | OIL | VIT C |
|---|---|---|---|---|---|---|---|
| HAMLIN | 18 - Sept | 8.77 | 1.34 | 6.54 | 31.53 | — | — |
|  | 07 - Oct | 8.91 | 1.00 | 8.91 | 32.00 | 0.004 | 48.60 |
|  | 04 - Nov | 9.65 | 0.86 | 11.23 | 33.03 | 0.005 | 48.82 |
|  | 19 - Nov | 10.18 | 0.83 | 12.41 | 34.5 | — | 47.42 |
|  | 30 - Nov | 10.4 | 0.79 | 13.39 | 34.60 | 0.004 | 48.33 |
|  | 14 - Dec | 10.94 | 0.72 | 15.3 | 35.5 | 0.003 | 45.17 |

TABLE IV-continued

CROP C

| VARIETY | DATE | BRIX | ACID | BAR | COLOR | OIL | VIT C |
|---|---|---|---|---|---|---|---|
| WESTIN | 18 - Sept | 8.81 | 1.21 | 7.32 | 31.50 | — | — |
|  | 07 - Oct | 8.95 | 0.90 | 10.07 | 32.43 | 0.003 | 38.15 |
|  | 04 - Nov | 10.64 | 0.69 | 15.48 | 34.23 | 0.004 | 42.42 |
|  | 19 - Nov | 10.97 | 0.64 | 17.14 | 35.70 | — | 49.45 |
|  | 30 - Nov | 11.44 | 0.62 | 18.46 | 36.40 | 0.005 | 38.47 |
|  | 14 - Dec | 11.51 | 0.6 | 19.15 | 36.70 | 0.004 | 35.22 |
| RUBY | 18 - Sept | 8.84 | 1.04 | 8.55 | 33.57 | — | — |
|  | 07 - Oct | 9.23 | 0.76 | 12.18 | 33.50 | 0.007 | 36.32 |
|  | 04 - Nov | 10.06 | 0.67 | 15.18 | 34.97 | 0.009 | 36.13 |
|  | 19 - Nov | 10.63 | 0.65 | 16.28 | 35.50 | — | 36.6 |
|  | 30 - Nov | 11.15 | 0.57 | 19.64 | 36.27 | 0.017 | 37.99 |
|  | 14 - Dec | 11.67 | 0.58 | 20.14 | 35.17 | 0.013 | 33.67 |
| VER-MELHA | 18 - Sept | 9.45 | 1.18 | 8.01 | 33.67 | — | — |
| (Earlygold) | 07 - Oct | 9.84 | 0.83 | 11.81 | 33.70 | 0.008 | 43.31 |
|  | 04 - Nov | 10.39 | 0.70 | 14.82 | 34.97 | 0.008 | 43.12 |
|  | 19 - Nov | 11.43 | 0.74 | 15.86 | 35.30 | — | 39.59 |
|  | 30 - Nov | 11.57 | 0.64 | 18.16 | 36.37 | 0.013 | 44.52 |
|  | 14 - Dec | 12.12 | 0.57 | 21.15 | 35.63 | 0.014 | 40.90 |
| ITABORAI | 18 - Sept | 9.03 | 0.14 | 7.94 | 33.97 | — | — |
|  | 07 - Oct | 9.33 | 0.89 | 10.47 | 34.10 | 0.009 | 36.16 |
|  | 04 - Nov | 10.16 | 0.73 | 13.99 | 35.67 | 0.008 | 35.25 |
|  | 19 - Nov | 10.85 | 0.71 | 15.39 | 36.57 | — | 39.59 |
|  | 30 - Nov | 11.11 | 0.66 | 16.86 | 37.27 | 0.012 | 35.73 |
|  | 14 - Dec | 11.61 | 0.64 | 18.19 | 36.33 | 0.011 | 32.42 |

Figure 8:
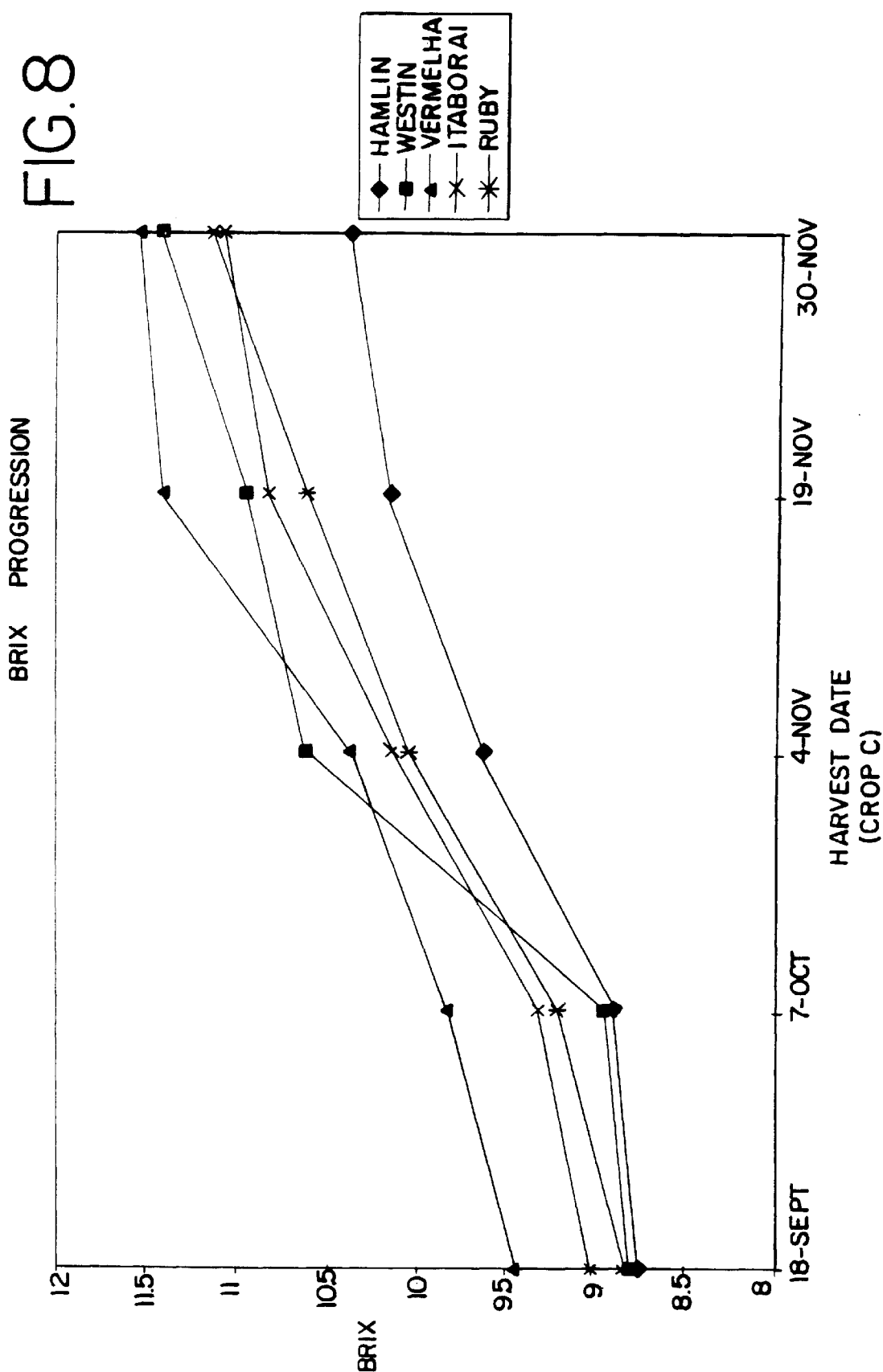
FIG. 8 is a plot of Brix values for five different cultivars, showing the progression of Brix development during a portion of a Crop C growing season.
Figure 9:
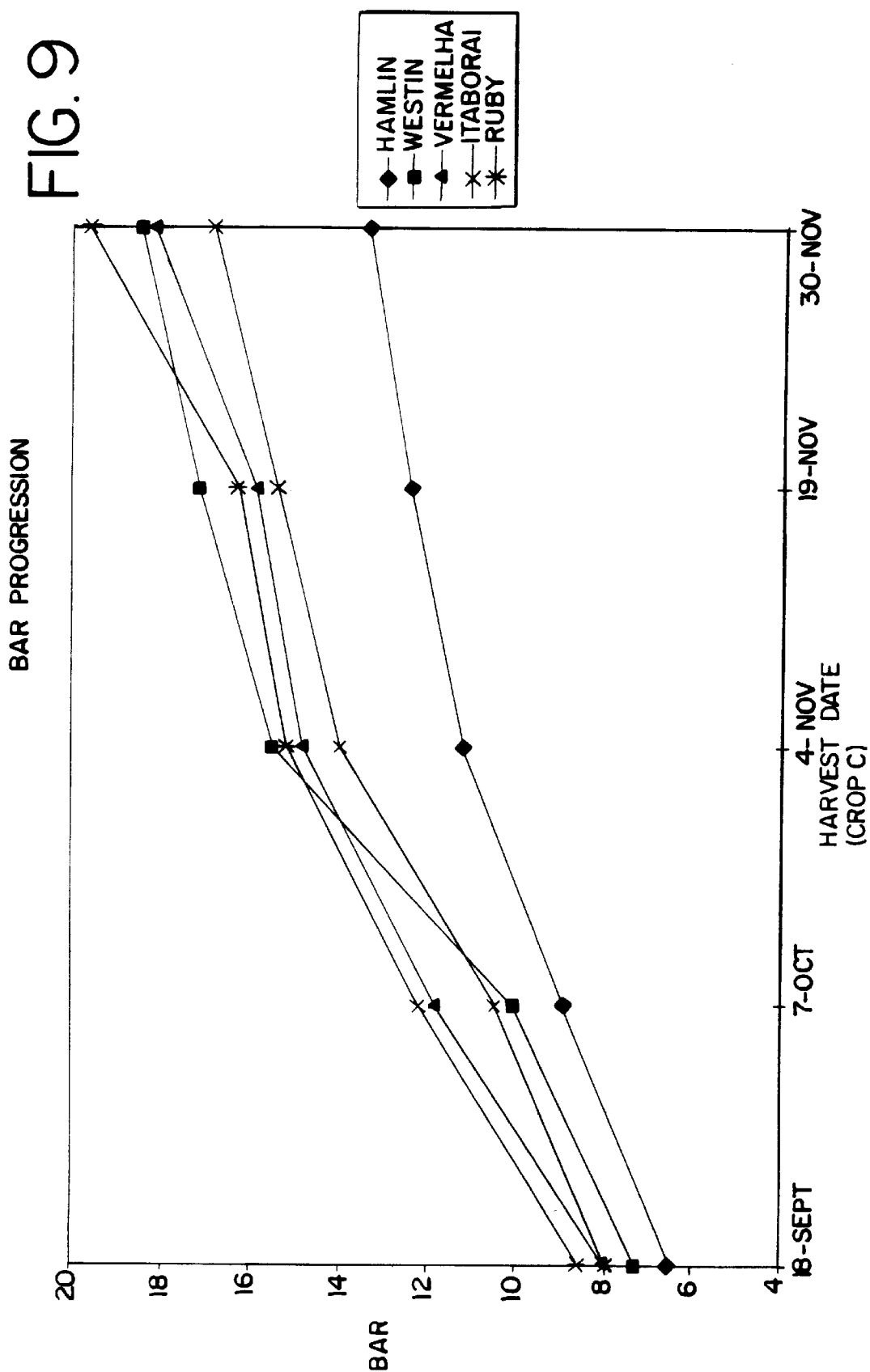
FIG. 9 is a plot of the ratio of Brix to citric acid content for Crop C.
Figure 10:
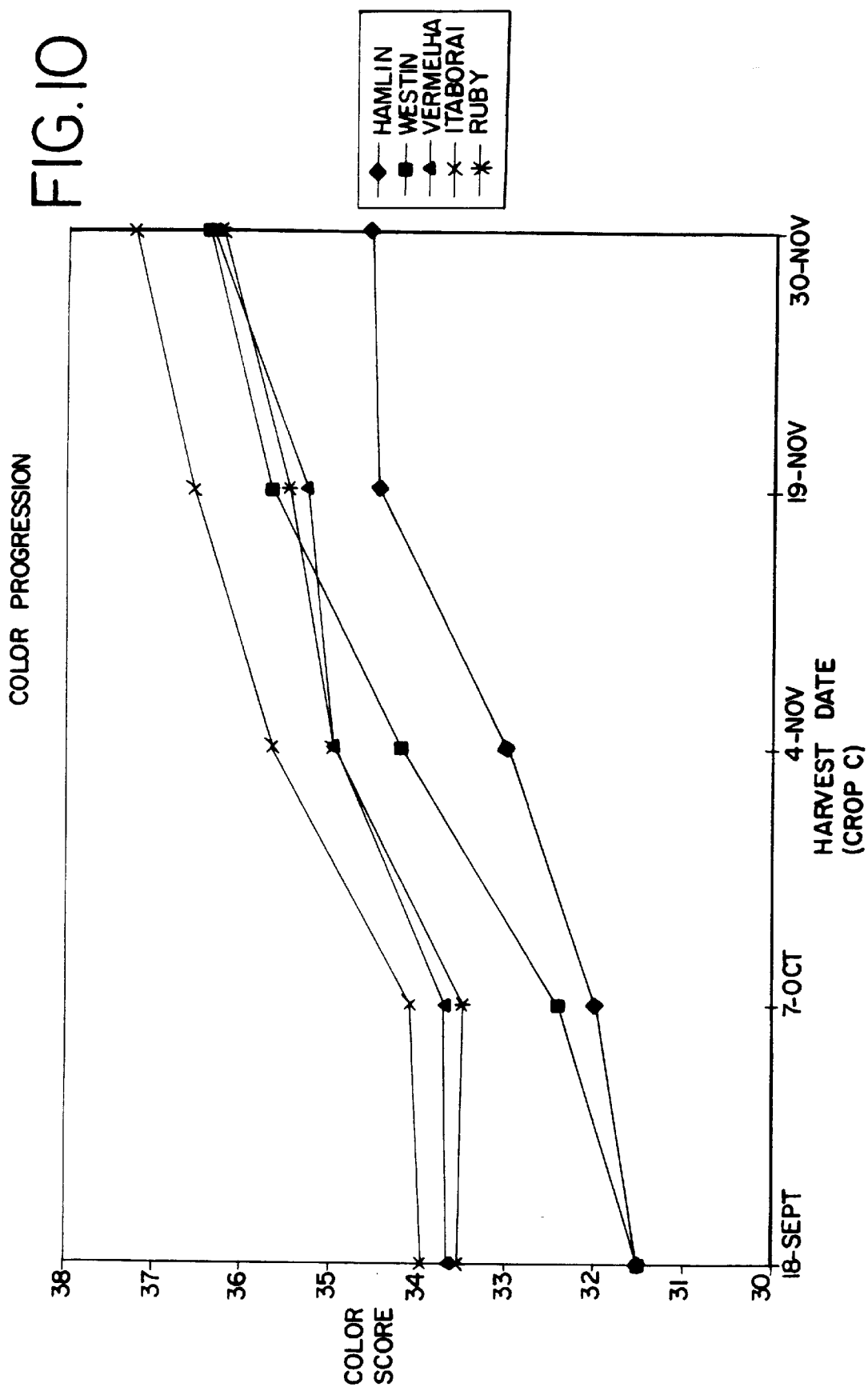
FIG. 10 is a plot of juice Color Number for the Crop C cultivars showing color development during the indicated time period.

FIG. 8 shows Brix data from Table IV, which indicates that each of the four very early season cultivars had Brix properties equal to or superior to those of the Hamlin fruit. FIG. 9 shows BAR data for the Crop C fruit, with the four very early season cultivars having higher bar values than the Hamlin fruit. FIG. 10 shows that the Color Value for the Hamlin juice is noticeably less than that for the other Crop C juice. With a few exceptions, this advantage of the early season cultivars is 1 CV or greater.

FIG. 12 is similar to FIG. 11 for Crop C data. The Hamlin harvest did not achieve the BAR orange standard until mid-October, whereas the Westin and Ruby Nucellar harvests achieved this BAR standard in late-September and the Seleta harvests achieved this BAR standard in mid-to-late September.

EXAMPLE 4

Sensory evaluations were made for Crop A, Crop B and Crop C. Trained sensory panel ratings were made for various characteristics of the juice from each of the five cultivars Hamlin, Westin, Ruby Nucellar, Vermelha and Itaborai. The descriptive sensory analyses were made in terms in accordance with the following terms: Orange component consisted of two categories, namely orange raw and orange peel oil. Other citrus ranged between lemon lime or grapefruit (one end of this scale) to tangerine (at the other end of this scale), the middle of the scale being orange. Other fruit notes were detected when present, with orange in the middle of this scale. Sweet, sour and bitter notes were reported. Another sensory analysis was for other aromatics, the comments associated with this sensory analysis parameter ranging from "green, sulfur" (at one undesirable end of the scale) to Painty (at the other undesirable end of the scale). The middle, most desirable section of this scale is denoted as floral.

Also generated were "overall quality" scores. Each overall quality score is on a scale of −2 to +2. For early season fresh juice supplies to be blended with stored juice, an overall quality score which is closer to zero, but not necessarily positive, is an acceptable overall quality score. This is due in part because the stored juice typically has an overall quality score of about zero or above.

Results from Crops A, B and C were averaged for fruit harvested in October, the sensory evaluations having taken place between about October 15 and November 1. This average overall quality score for the Hamlin, Westin and Ruby Nucellar varieties was −1.2. For Seleta de Itaborai and Seleta Vermelha, the average overall quality score was −1.1.

Average overall quality scores for November were also determined for a period between about November 1 and November 20. For the Hamlin and Seleta de Itaborai varieties, the average overall quality score was −0.7. For Seleta Vermelha, the average overall quality score was −0.8. For the Ruby Nucellar variety, the average overall quality score was −0.6, and for the Westin variety, the average overall quality score was −0.5.

These data show that, for sensory evaluations carried out on October and November harvests, the early variety cultivars have overall quality scores which are at least comparable to those of the Hamlin variety. This indicates that substitution of any of these four very early season varieties for some or all of Hamlin freshly squeezed juice in a not from concentrate orange juice product will not negatively impact upon the sensory evaluation or taste of the not from concentrate orange juice.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A method of preparing early season not from concentrate orange juice, comprising the steps of:
   harvesting a very early season orange cultivar selected from the group consisting of a cultivar within the Seleta family of cultivars, a Westin cultivar, a Ruby Nucellar cultivar, or a combination of these very early season cultivars, said harvesting being very early in the harvesting season for orange fruit, namely no later than the harvesting season of Hamlin orange fruit in the growing territory;
   extracting juice from a volume of said very early season oranges of said harvesting step;
   collecting the resulting extracted orange juice as an early season orange juice having a Color Number of at least 33 CN units, said Color Number being greater than Hamlin orange juice harvested at the time of said harvesting step; and
   blending said extracted early season orange juice with another orange juice source in order to provide a not from concentrate orange juice product having a Color Number in excess of 33 CN units, while also exhibiting sensory qualities substantially equivalent to the sensory qualities of Hamlin orange juice.

2. The method of claim 1, wherein said harvesting step occurs in October or November in the Northern Hemisphere.

3. The method of claim 1, wherein said blending step blends a stored orange juice as the another orange juice source.

4. The method of claim 1, wherein said blending step incorporates up to about 80 weight percent of said extracted orange juice.

5. The method of claim 1, wherein said collecting step provides early season orange juice having a Color Number of at least 1 CN greater than Hamlin orange juice harvested at the time of said harvesting step.

6. The method of claim 1, wherein said collecting step provides early season orange juice having a Color Number of at least 2 CN greater than Hamlin orange juice harvested at the time of said harvesting step.

7. The method of claim 1, wherein said cultivar within the Seleta family is selected from the group consisting of Seleta Branca, Seleta Coroa-do-Rei, Seleta de Itaborai, Seleta Vermelha, and combinations thereof.

8. The method of claim 1, wherein said collecting step provides a juice having a Brix-to-acid ratio (BAR) during the months of October and November which meets or exceeds the Orange Fruit Maturity Standards of the Florida Department of Agriculture & Consumer Services.

9. The method of claim 1, wherein said extracting occurs during an extraction time period which is early in the orange growing season.

10. The method of claim 1, wherein said harvesting step selects a cultivar having an early season color of at least about 2 CN greater than Hamlin orange juice of a corresponding harvest time.

11. The method of claim 1, wherein said harvesting step selects fruit of an orange cultivar which provides juice during the months of October and November having a Color Number which is more intense than juice provided by Hamlin oranges during the months of October and November, respectively, while also exhibiting sensory qualities substantially equivalent to the sensory qualities of juice Hamlin orange cultivars harvested during October and November, respectively; and said extracting step occurs during an extraction time period which is very early in the orange harvesting season.

12. The method in accordance with claim 1, wherein said collecting step provides a juice having a Brix value which meets or exceeds the minimum total solids requirement during the months of October and November of the Florida Department of Agriculture & Consumer Services, and this juice of said collecting step provides a Brix-to-acid ratio (BAR) during the months of October and November which meets or exceeds the Orange Fruit Maturity Standards of the Florida Department of Agriculture & Consumer Services for BAR during the months of October and November.

13. The method of claim 1, wherein said blending step provides a product having a Color Number of at least about 35 CN units.

14. The method in accordance with claim 1, wherein said harvesting step selects orange cultivar fruit which provides early season color which has an early season color value which is at least about 1 Color Number greater than that of juice extracted from said Hamlin oranges.

15. A method of preparing not from concentrate orange juice from oranges, comprising the steps of:
   harvesting an orange cultivar fruit selected from the group consisting of Westin cultivars, Ruby Nucellar cultivars, Itaborai cultivars, Vermelha cultivars, and combinations thereof, said harvesting being very early in the harvesting season for orange fruit, namely no later than the harvesting season of Hamlin orange fruit in the growing territory;
   extracting juice from a volume of said orange cultivar fruit;
   collecting the resulting extracted orange juice as an early season orange juice source having a Color Number of at least 33 CN units, said Color Number being greater than Hamlin orange juice harvested at the time of said harvesting step; and combining the extracted early season orange juice from said extracting step with another juice in order to provide a not from concentrate orange juice product.

16. The method of claim 15, wherein said combining step provides a not from concentrate orange juice product having a Color Number which is greater than 33 CN units.

17. The method of claim 15, wherein said harvesting step occurs in October or November in the Northern Hemisphere.

18. The method of claim 15, wherein said collecting step provides early season orange juice having a Color Number of at least 1 CN greater than Hamlin orange juice harvested at the time of said harvesting step.

19. The method of claim 15, wherein said collecting step provides early season orange juice having a Color Number of at least 2 CN greater than Hamlin orange juice harvested at the time of said harvesting step.

20. The method of claim 15, wherein said collecting step provides a juice having a Brix-to-acid ratio (BAR) during the months of October and November which meets or exceeds the Orange Fruit Maturity Standards of the Florida Department of Agriculture & Consumer Services.

21. The method of claim 14, wherein said harvesting step selects fruit of an orange cultivar having early season color which is at least 1 Color Number unit greater than that of juice extracted from Hamlin oranges harvested at the time of said harvesting step, while also exhibiting sensory qualities substantially equivalent to the sensory qualities of said harvested Hamlin orange cultivars.

22. The method of claim 15, wherein said blending step provides a product having a Color Number of at least about 35 CN units.

23. The method in accordance with claim 15, wherein said harvesting step selects orange cultivar fruit which provides early season color which has an early season color value which is at least about 2 Color Numbers greater than that of juice extracted from said Hamlin oranges.

24. The method of claim 15, wherein said blending step blends a stored orange juice as the another orange juice source.

25. The method of claim 15, wherein said blending step incorporates up to about 80 weight percent of said extracted orange juice.

26. The method in accordance with claim 15, wherein said collecting step provides a juice having a Brix value which meets or exceeds the minimum total solids requirement during the months of October and November of the Florida Department of Agriculture & Consumer Services, and this juice of said collecting step provides a Brix-to-acid ratio (BAR) during the months of October and November which meets or exceeds the Orange Fruit Maturity Standards of the Florida Department of Agriculture & Consumer Services for BAR during the months of October and November.

27. A not from concentrate orange juice prepared in accordance with a process comprising the steps of:

harvesting a very early season orange cultivar selected from the group consisting of a cultivar within the Seleta family of cultivars, a Westin cultivar, a Ruby Nucellar cultivar, or a combination of these very early season cultivars, said harvesting being very early in the harvesting season from orange fruit, namely no later than the harvesting season of Hamlin orange fruit in the growing territory;

extracting juice from a volume of said very early season oranges of said harvesting step;

collecting the resulting extracted orange juice as an early season orange juice having a Color Number of at least 33 CN units, said Color Number being greater than Hamlin orange juice harvested at the time of said harvesting step; and blending said extracted early season orange juice with another orange juice source in order to provide a not from concentrate orange juice product having a Color Number in excess of 33 CN units, while also exhibiting sensory qualities substantially equivalent to the sensory qualities of Hamlin orange juice.

28. The orange juice of claim 27, wherein said very early season orange cultivars are harvested in October.

29. The orange juice of claim 27, wherein said very early season orange cultivars are harvested in November.

30. The orange juice of claim 27, wherein said extracted early season orange juice comprises up to about 80 weight percent of the not from concentrate juice.

31. The orange juice of claim 27, wherein said extracted early season orange juice has a Color Number which is at least 1 CN greater than Hamlin orange juice.

32. The orange juice of claim 27, wherein said extracted early season orange juice has a Color Number which is at least 2 CN greater than Hamlin orange juice.

33. The orange juice of claim 27, wherein said cultivar within the Seleta family is selected from the group consisting of Seleta Branca, Seleta Coroa-do-Rei, Seleta de Itaborai, Seleta Vermelha, and combinations thereof.

34. The orange juice of claim 27, wherein said cultivar within the Seleta family is selected from the group consisting of Seleta de Itaborai, Seleta Vermelha, and combinations thereof.

35. The orange juice of claim 27, wherein said early season orange juice has a Brix value which meets or exceeds the minimum total solids requirement during the months of October and November of the Florida Department of Agriculture & Consumer Services, and this juice of said collecting step provides a Brix-to-acid ratio (BAR) during the months of October and November which meets or exceeds the Orange Fruit Maturity Standards of the Florida Department of Agriculture & Consumer Services for BAR during the months of October and November.

36. The orange juice of claim 27, wherein said extracting occurred during an extraction time period which is early in the orange growing season.

37. A not from concentrate orange juice prepared in accordance with a process comprising the steps of:

harvesting an orange cultivar fruit selected from the group consisting of Westin cultivars, Ruby Nucellar cultivars, Itaborai; Vermelha cultivars, and combinations thereof, said harvesting being very early in the harvesting season for orange fruit, namely no later than the harvesting season of Hamlin orange fruit in the growing territory;

extracting juice from a volume of said orange cultivar fruit;

collecting the resulting extracted orange juice as an early season orange juice source having a Color Number of at least 33 CN units, said Color Number being greater than Hamlin orange juice harvested at the time of said harvesting step; and combining the extracted early season orange juice from said extracting step with another juice in order to provide a not from concentrate orange juice product.

38. The orange juice of claim 37, wherein said orange juice product exhibits sensory qualities substantially equivalent to the sensory qualities of Hamlin orange cultivars harvested at the time of said harvesting step.

39. The orange juice of claim 37, wherein said extracting step provides juice during the months of October and November having a Color number which is more intense than juice provided by Hamlin oranges during the months of October and November, respectively, while also exhibiting sensory qualities substantially equivalent to the sensory qualities of juice Hamlin orange cultivars harvested during October and November, respectively; and said blending step provides an orange juice product having a color value in excess of 33 CN units.

40. A not from concentrate orange juice composition comprising a blend of:

at least about 1 percent by weight of a stored orange juice, based upon the total weight of the composition;

up to about 99 weight percent of a very early season fresh orange juice, based upon the total weight of the composition;

said very early season fresh orange juice is extracted from said early season round orange cultivars selected from the group consisting of a cultivar within the Seleta family of cultivars, a Westin cultivar, a Ruby Nucellar cultivar, or a combination of these early season cultivars, said early season cultivars having been harvested at a time no later than the harvesting season of Hamlin orange fruit; and said orange juice composition has a Color Number of at least about 1 CN greater than Hamlin orange juice harvested at said time the early season cultivars had been harvested, while also exhibiting sensory qualities at least as beneficial as the sensory qualities of Hamlin orange juice.

41. The composition of claim 40, wherein said stored juice comprises at least about 10 percent by weight, and said very early season fresh juice comprises up to about 90 percent by weight.

42. The composition of claim 40, wherein said stored juice comprises at least about 20 percent by weight, and said very early season fresh juice comprises up to about 80 percent by weight.

43. A not from concentrate orange juice composition comprising a blend of:

at least about 1 percent by weight of a stored orange juice, based upon the total weight of the composition;

up to about 99 weight percent of a very early season fresh orange juice, based upon the total weight of the composition;

said very early season fresh orange juice is extracted from said early season round orange cultivars selected from the group consisting of a Westin cultivar, a Ruby Nucellar cultivar, a Seleta Itaborai cultivar, a Seleta Vermelha cultivar, or a combination of these early season cultivars, said early season cultivars having been harvested at a time no later than the harvesting season of Hamlin orange fruit; and said orange juice composition has a Color Number of at least about 1 CN greater than Hamlin orange juice harvested at said time the early season cultivars had been harvested, while also exhibiting sensory qualities at least as beneficial as the sensory qualities of Hamlin orange juice.

44. The composition of claim 43, wherein said stored juice comprises at least about 10 percent by weight, and said very early season fresh juice comprises up to about 90 percent by weight.

45. The composition of claim 43, wherein said stored juice comprises at least about 20 percent by weight, and said very early season fresh juice comprises up to about 80 percent by weight.

46. A not from concentrate orange juice composition comprising a blend of:

at least about 1 percent by weight of a stored orange juice, based upon the total weight of the composition;

up to about 99 weight percent of a very early season fresh orange juice, based upon the total weight of the composition;

said very early season fresh orange juice is extracted from said early season round orange cultivars selected from the group consisting of a Seleta Itaborai cultivar, a Seleta Vermelha cultivar, or a combination of these early season cultivars, said early season cultivars having been harvested at a time no later than the harvesting season of Hamlin orange fruit; and said orange juice composition has a Color Number of at least about 1 CN greater than Hamlin orange juice harvested at said time the early season cultivars had been harvested, while also exhibiting sensory qualities at least as beneficial as the sensory qualities of Hamlin orange juice.

47. A not from concentrate orange juice composition comprising a blend of:

at least about 1 percent by weight of a stored orange juice, based upon the total weight of the composition;

up to about 99 weight percent of a very early season fresh orange juice, based upon the total weight of the composition;

said very early season fresh orange juice is extracted from said early season round orange cultivars selected from the group consisting of a cultivar within the Seleta family of cultivars, or a combination of these early season cultivars, said early season cultivars having been harvested at a time no later than the harvesting season of Hamlin orange fruit; and said orange juice composition has a Color Number of at least about 1 CN greater than Hamlin orange juice harvested at said time the early season cultivars had been harvested, while also exhibiting sensory qualities at least as beneficial as the sensory qualities of Hamlin orange juice.

* * * * *

UNITED STATES PATENT AND TRADEMARK OFFICE
CERTIFICATE OF CORRECTION

PATENT NO.    : 6,143,347
DATED         : November 7, 2000
INVENTOR(S)   : Keithly et al.

Page 1 of 1

It is certified that error appears in the above-identified patent and that said Letters Patent is hereby corrected as shown below:

Column 5,
Line 32, after "solids" insert -- that --.

Column 7,
Line 43, delete "or" and insert -- on --.

Column 9,
Line 31, delet "show" and insert -- shows --.

Column 14,
Line 47, after "Itaborai" delete ";" and insert -- , --.

Column 15,
Line 1, "number" should read -- Number --.

Signed and Sealed this

Eighteenth Day of December, 2001

Attest:

*Attesting Officer*

JAMES E. ROGAN
*Director of the United States Patent and Trademark Office*

(12) EX PARTE REEXAMINATION CERTIFICATE (6437th)
United States Patent
Keithly et al.

(10) Number: US 6,143,347 C1
(45) Certificate Issued: Sep. 16, 2008

(54) EARLY SEASON NOT FROM CONCENTRATE ORANGE JUICE AND PROCESS OF MAKING

(75) Inventors: James H. Keithly, Bradenton, FL (US); Harold Pollack, St Petersburg, FL (US); Thomas Taggart, Bradenton, FL (US)

(73) Assignee: Tropicana Products, Inc., Bradenton, FL (US)

Reexamination Request:
No. 90/006,150, Nov. 27, 2001

Reexamination Certificate for:
Patent No.: 6,143,347
Issued: Nov. 7, 2000
Appl. No.: 09/311,956
Filed: May 14, 1999

Disclaimer of Claims 1through 47 Filed Feb. 11, 2008. (O.G. Jun. 3, 2008, vol. 1331, No. 1.

Certificate of Correction issued Dec. 18, 2001.

(51) Int. Cl.
*A23L 2/06* (2006.01)
*A23L 2/02* (2006.01)

(52) U.S. Cl. ........................................ 426/599; 426/616
(58) Field of Classification Search ........................ None
See application file for complete search history.

(56) References Cited

U.S. PATENT DOCUMENTS 3,917,867 A 11/1975 Atkins et al.

FOREIGN PATENT DOCUMENTS

WO   WO 01/87092   11/2001

OTHER PUBLICATIONS

Potter et al., Food Science, Fifth Edition, Quality Factors, pp. 90–11, 1995.*

Nagy et al., Citrus Science and Technology, vol. 2, 1977, pp. 201–202.*

Kale et al., Chapter 3—Citrus In Handbook of Fruit Science and Technology Production, Composition, Storage, and Processing, 195, pp. 39–65.*

Morris, ("The Orange Juice Production Process and Product Forms" Morris Citrus Economics Newsletter, vol. 1, Issue 8, 1996 [online] [retrieved on Oct. 27, 2005]. Retrieved from www.ultimatecitrus.com/oj.html.*

Wiltbank, "Orange. (fruit)." Encyclopedia Americana, 2007. [online]. [retrieved on Mar. 12, 2007]. Retrieved from Grolier Online.*

Lotong et al., "Matching Results of Two Independent Highly Trained Sensory Panels Using Different Descriptive Analysis Methods," Journal of Sensory Studies 17, 5, (2002): 429–444.*

Potter et al., Food Science, Fifth Edition, 1995, Chapman & Hall, New York, pp. 90–111.*

Gmitter, "Characteristics and Potential of New Citrus Cultivars," Citrus Processing Short Course 1995, Food Industry Short Course Proceedings, Florida Agricultural Experimental Station, Journal Series No. N–01137 (p. 165–172), USA 1995.

Widmer & Barros, "Flavonoids in Ambersweet Orange and the Impact on Juice Adulteration Detection," 46th Annual Citrus Processors' Meeting Oct. 11, 1995 (p. 21–26), Citrus Research and Education Center, Lake Alfred, Florida (Univ. of Florida)(1995).

Castle, "Varieties, Rootstocks, and Juice Quality," Citrus Processing—Present and Future, 1992 Food Industry Short Course, Florida Agricultural Experiment Station Journal Series No. N–00640 (p. 1–9) USA 1995.

Castle, "Horticultural Field Day, St. Cloud, Florida, Dec. 2, 1992," (p. 1–13), Citrus Research and Education Center, Lake Alfred, Florida (Univ. of Florida)(1992).

Table 5 in Cite No. II.

Pio, Pompeu & Sobrinho, Study of Some Characteristics of Fruit and Seeds of Various Kinds of Sweet Orange, *Citrus sinensis* (L.) Osbeck, (p. 1–12) Sao Paulo, Brazil (circa 1983)(English translation of reference previously filed).

Bonaventura and Russo, "Refrigeration of Blood Oranges Destined for Transformation, Note 1: Tests on Juice Stability," *Isituto Industrie Agrarie, Universitia.degli.Studi*, Catania, Italy, *Fruit Processings*, pp. 284–289., 1993 (and abstract).

Braddock, Robert J., "Handbook of Citrus By–Products and Processing Technology," *University of Florida Institute of Food and Agricultrual Sciences*, Lake Alfred, Florida, p. 53, date unknown.

Kimball, Dan A., "Citrus Processing Quality Control and Technology," *Citrus Microbiology*, p. 239, date unknown.

Andrade et al., "Measuring Certain Characteristics of West and Maracana Sweet Orange Trees," *Scientific*, 6(1): 93–100, 1978, Sao Paolo, Brazil, (and English translation).

Lafuente et al., "Methods Used to Obtain Blends of Orange—Juice Having a Pre–Established Color," *Journal of Agrochemistry and Food Technology*, 19(4):549–553, 1979, Valencia, Spain, (and English translation).

Pao et al., "Formulation and Sensory Evaluation of Fresh–Squeezed, Unpasteurized Citrus Juice Blends," *Fruit Processing*, Florida Dept. of Citrus, Jul. 1996. (and abstract).

Pio et al., "A study on Some Fruit and Seed Characteristics of Various Types of Sweet Orange (*Citrus sinesis* (L.) Osbeck", *Empresa Catarinese de Pesquisa Agropecuaria S.A. Florianpolis*, vol. 2, pp. 732–641, 1984 (Abstract).

(Continued)

*Primary Examiner*—Dwayne C Jones

(57) ABSTRACT

Not from concentrate orange juice is provided which includes as a freshly squeezed orange juice component juice extracted from an early season round orange cultivar which has a color intensity in excess of that provided by Hamlin cultivars which are harvested at the same time as the early season cultivar, which is not a Hamlin cultivar. The juice extracted from such early season cultivar has sensory attributes which are at least as acceptable as Hamlin fresh juice. Preferred early season cultivars are within the Seleta family or are Westin cultivars or are Ruby Nucellar cultivars.

OTHER PUBLICATIONS

Castle, Bill, "Promising New Selections of Sweet Orange Cultivars," *Citrus Industry*, pp. 24–28, Jun. 1999.

S. M. Barros and R. D. Carter, "'Ambersweet Orange'—Processed Juice Quality Characteristics", *Florida Department of Citrus*, 1990 and C.J. Hearn, *United States Dept. of Agriculture*.

L.C. Donadio, et al., "Evaluation of Sweet Orange Preimmunized Clones", *Proc. Interamer. Soc. Trop. Hort.* 39:103–105. 1995.

Hyoung S. Lee and William S. Castle, "Seasonal Changes of Carotenoid Pigments and Color in Hamlin, Earlygold, and Budd Blood Orange Juices", *J. Agric. Food Chem. 2001*, 49, 877–882.

V.M.M. Andrade et al., "Determinacao De Algumas Caracteristicas Das Laranjeiras Doces Westin E Maracana", (*Citrus senensis L.* Osbeck).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT PRINTED HEREIN.

Column 1, line 53 to column 2, line 2:

Color is a property of juices which can be measured in an objective manner for purposes of evaluating the color acceptability of a particular type of juice. In the case of citrus juices, the industry generally recognizes a parameter referred to as Color Number. Details of color determination, including procedures, equipment and standards, are found in Redd, Hendrix and Hendrix, Quality Control Manual for Citrus Processing Plants, vol. 1: Regulation, Citrus Methodology, Microbiology, Conversion Charts, Tables, Other; 1986; Intercit., Inc., Safety Harbor, Fla. A [calorimeter] *colorimeter* is a primary component of the Color Number determination procedure. Redd et al provides specific calibration information for a variety of instruments, including HunterLab Model D45, HunterLab Model D45D2, HunterLab LabScan Colorimeter Model LS-5100, MacBeth Color-Eye colorimeter Model 1500 and Minolta Portable Colorimeter Model Chroma Meter II Reflectants/CR 100.

AS A RESULT OF REEXAMINATION, IT HAS BEEN DETERMINED THAT:

Claims 1-47 are now disclaimed.

\* \* \* \* \*